(12) United States Patent
Skalli et al.

(10) Patent No.: US 8,660,329 B2
(45) Date of Patent: Feb. 25, 2014

(54) METHOD FOR RECONSTRUCTION OF A THREE-DIMENSIONAL MODEL OF A BODY STRUCTURE

(75) Inventors: Wafa Skalli, Paris (FR); Ludovic Humbert, Paris (FR); David Mitton, Kremlin Bicetre (FR); Jean Dubousset, Paris (FR); Jacques De Guise, Montreal (CA); Benoit Godbout, Montreal (CA); Stefan Parent, Saint-Lambert (CA)

(73) Assignees: Ecole Nationale Superieure d'Arts et Metiers (ENSAM), Paris (FR); Centre National de la Recherche Scientifique (CNRS), Paris (FR); Ecole de Technologie Superieure, Montreal (CA)

( * ) Notice: Subject to any disclaimer, the term of this patent is extended or adjusted under 35 U.S.C. 154(b) by 1096 days.

(21) Appl. No.: 12/601,975

(22) PCT Filed: May 25, 2007

(86) PCT No.: PCT/IB2007/001383
§ 371 (c)(1),
(2), (4) Date: Nov. 25, 2009

(87) PCT Pub. No.: WO2008/146069
PCT Pub. Date: Dec. 4, 2008

(65) Prior Publication Data
US 2010/0174673 A1 Jul. 8, 2010

(51) Int. Cl.
*G06K 9/00* (2006.01)
(52) U.S. Cl.
USPC .......................................... 382/131; 382/128
(58) Field of Classification Search
USPC .................. 382/128, 131, 132, 154
See application file for complete search history.

(56) References Cited

U.S. PATENT DOCUMENTS

| | | | |
|---|---|---|---|
| 6,621,491 B1* | 9/2003 | Baumrind et al. | 345/419 |
| 7,194,295 B2 | 3/2007 | Vilsmeier | |
| 7,227,981 B1 | 6/2007 | Fleute et al. | |
| 7,639,866 B2 | 12/2009 | Pomero et al. | |
| 2001/0026637 A1* | 10/2001 | Lelong et al. | 382/128 |
| 2005/0004451 A1 | 1/2005 | Vilsmeier et al. | |
| 2005/0008219 A1* | 1/2005 | Pomero et al. | 382/154 |
| 2006/0110037 A1* | 5/2006 | Kaus et al. | 382/173 |
| 2006/0204069 A1* | 9/2006 | Le Bras et al. | 382/132 |
| 2007/0093998 A1 | 4/2007 | El-Baroudi | |

FOREIGN PATENT DOCUMENTS

FR 2856170 12/2004

OTHER PUBLICATIONS

Deschenes et al. ("3D Reconstruction of the Human Spine from bi-planar radiographs: using multi-scale wavelets analysis and splines interpolators for semi-automation," Proceedings of SPIE, vol. 5032 (2003), pp. 754-761).*

(Continued)

*Primary Examiner* — Yubin Hung
(74) *Attorney, Agent, or Firm* — BCF LLP

(57) ABSTRACT

Method for reconstruction of a three-dimensional model of a body structure of a subject, said structure comprising a plurality of objects, wherein a database (21) of the structure is provided, the database comprising means to estimate, from a parameter of any object of the structure, another parameter for an object of the structure, a preliminary solution for a first object (L1) is modified to be brought in concordance with subject-specific data (23a, 23b), a reconstruction of the second object (T12) is obtained based on the modified first object and on the database of structure (21).

29 Claims, 7 Drawing Sheets

(56) References Cited

OTHER PUBLICATIONS

Kadoury et al. ("Personalized X-Ray 3-D Reconstruction of the Scoliotic Spine From Hybrid Statistical and Image-Based Models," IEEE Transaction on Medical Imaging, vol. 38, No. 9, Sep. 2009, pp. 1422-1435).*

English Abstract of FR 2856170.

Said Benameur, "Reconstruction 3D Biplanaire non Supervisee de la colonne vertebrale et de la cage thoracique scoliotiques par modeles statistiques", Ecole de Technologies Superieure Universite du Quebec, Montreal, Quebec, www.iro.umontreal.ca/{benameus/Publications/thesus_benameur.pdf,.

English Abstract of FR 2856170, (2004).

Search Report from PCT/IB/2007/001383 dated Sep. 21, 2007.

Said Benameur, "Reconstruction 3D Biplanaire non Supervisee de la colonne vertebrale et de la cage thoracique scoliotiques par modeles statistiques", Ecole de Technologies Superieure Universite du Quebec, Montreal, Quebec, www.iro.umontreal.ca/{benameus/Publications/thesus_benameur.pdf, (2004).

Benameur et al., "3D/2D Registration and segmentation of scoliotic vertebrae using statistical models, Computerized Medical Imaging and Graphics", Pergamon Press, New York, NY, US, vol. 27 No. 5., Sep. 2003, pp. 321-337.

Benameur et al., "A hierarchical statistical modeling approach for the unsupervised 3-D biplanar reconstruction of the scoliotic spine", IEEE Transactions on Biomedical Engineering IEEE USA, vol. 52 No. 12, Dec. 2005.

* cited by examiner

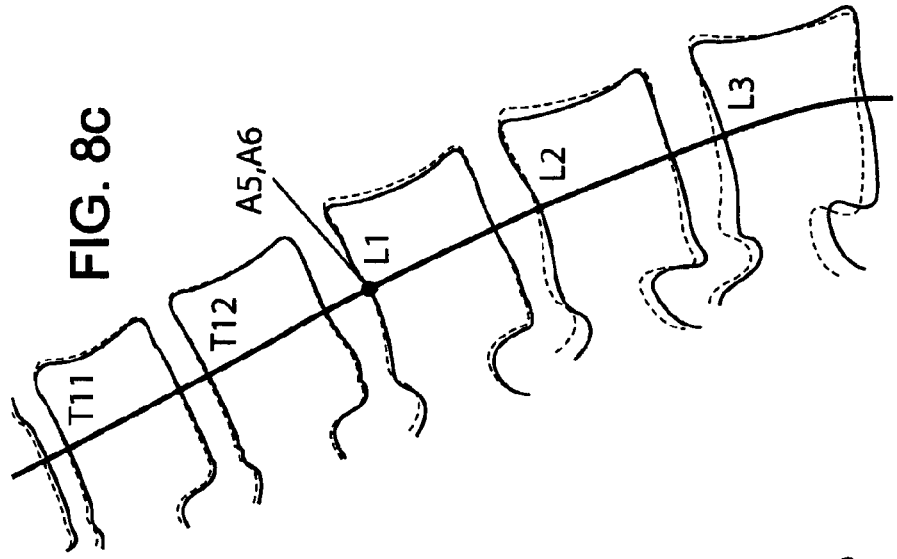
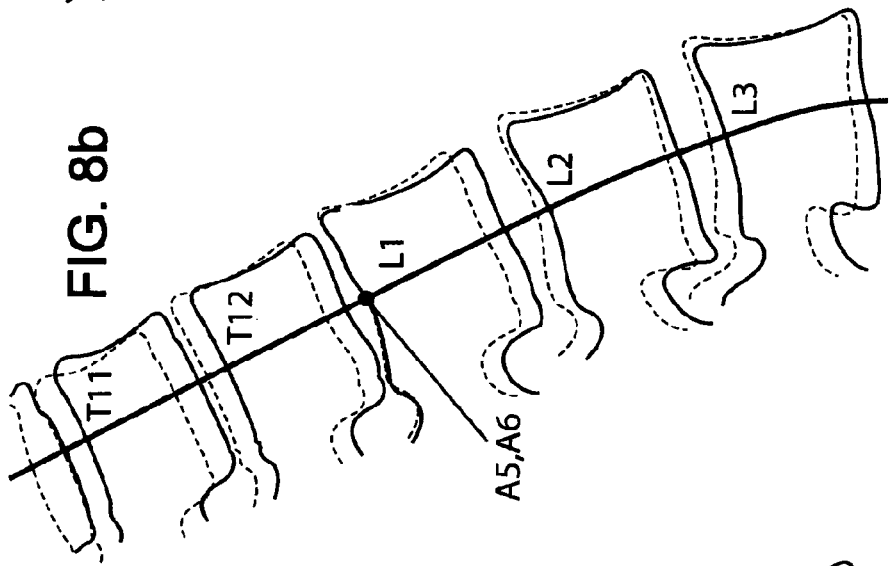
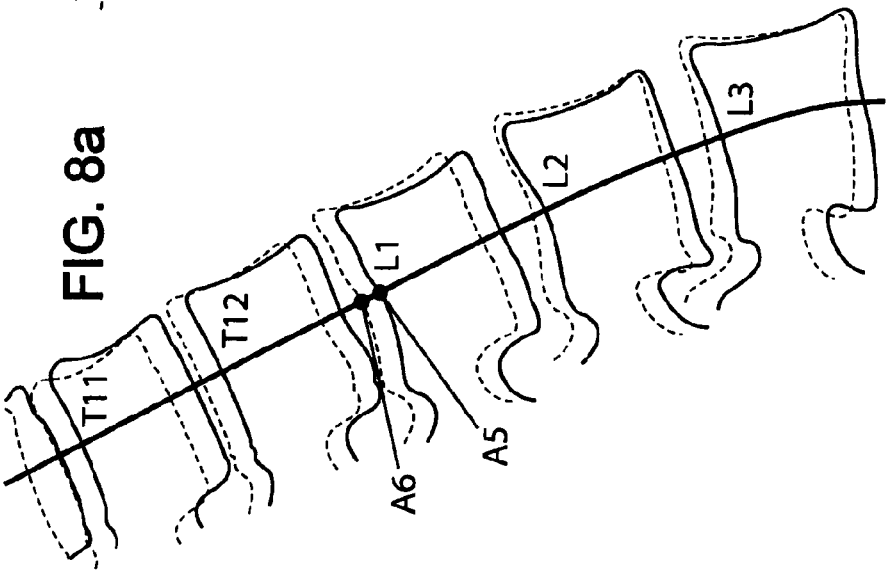

METHOD FOR RECONSTRUCTION OF A THREE-DIMENSIONAL MODEL OF A BODY STRUCTURE

FIELD OF THE INVENTION

The instant invention relates to a method for reconstruction of a three-dimensional model of a body structure.

BACKGROUND OF THE INVENTION

In particular, the instant invention is related to a method for reconstruction of a three-dimensional model of a body structure, said structure comprising a plurality of objects, wherein
a knowledge base of said structure is provided, said knowledge base of structure comprising a knowledge base of each object of said structure,
a preliminary solution of at least a first object of the structure is obtained from said knowledge base of the object.

FR 2 856 170 describes such a method for reconstruction, which enables to obtain a three-dimensional subject-specific reconstruction of an osteo-articular, such as the human spine, from few calibrated radiographs. Although this process is quick, reliable and limits the intervention of the human operator, there is a continued need to obtain more automatic reconstruction methods. There is a need to limit human intervention, so that reproducibility of the reconstruction method is enhanced, and that its access to untrained personal, not having high knowledge in anatomy, can be facilitated.

The instant invention has notably for object to mitigate at least one of these drawbacks.

SUMMARY OF THE INVENTION

To this aim, the invention relates to a method for reconstruction of a three-dimensional model of a body structure of a patient, said structure comprising a plurality of objects, wherein
(a) bi-dimensional subject-specific detection data of said structure is provided,
(b) a knowledge base of said structure is provided, said knowledge base comprising a priori knowledge of the structure, previously established from structures of the same type as the structure to be reconstructed, said knowledge base of structure comprising a knowledge base of each object of said structure, the knowledge base of each object thus comprising a priori knowledge base of the respective object, previously established from objects of the same type as the respective object, the knowledge base of said structure being adapted to estimate, from a parameter of any object of the structure, another parameter for at least an object of the structure,
(c) a three-dimensional preliminary solution of the structure is obtained,
(d) the preliminary solution of at least a first portion of an object is selected from the preliminary solution of the structure,
(e) the preliminary solution of at least the first portion of object is modified to be brought in concordance with said subject-specific data,
(f) at least a three-dimensional subject-specific reconstruction of at least a second portion of object is obtained based on the modified preliminary solution of the first portion of object obtained at step (e) and on the knowledge base of structure.

With these features, a subject-specific reconstruction of at least a portion of an object is obtained based on the modification of the preliminary solution of a portion of a first object. This enables to quickly obtain an accurate reconstruction of at least a sub-part of the structure with a minimal human user intervention. For objects for which the detection data is of low quality, accurate subject-specific reconstructions of objects for which few detection data are available could be obtained based on fitting the subject-specific reconstruction for other objects on detection data of better quality. The method will be particularly powerful when the structure comprises many objects, such as the spine or the whole skeleton.

Further, human user intervention is reduced, and thus reproducibility is enhanced.

Such a method can be relied upon by medical end users such as surgeons for diagnostic and/or preoperative planning for example. It could be quick enough to enable for example real time reconstruction for computer-assisted navigation applications based on intra-operative detection data during surgery.

In some embodiments, one might also use one or more of the following features:
(f1) a first set of parameters of the first object is obtained from the modified preliminary solution of the first portion of object obtained at step (e),
(f2) the knowledge base provides, from the first set of parameters, a second set of parameters for at least the second portion of object, and
(f3) the subject-specific reconstruction of the second portion of object is obtained based on the second set of parameters and on the knowledge base for objects comprising the second portion,
the parameters are geometrical parameters of a feature of the preliminary solution of the first portion of object representing an anatomical feature of the first portion of object;
during step (f2),
the second set of parameters for the subject-specific reconstruction of the second portion of object is calculated by statistical inference on the knowledge base of structure using the first set of parameters of the first portion of object as an estimator;
during step (f3), the subject-specific reconstruction of the second portion of object is obtained by statistical inference on the knowledge base of objects comprising the second portion of object, using the second set of parameters for the subject-specific reconstruction of the second portion of object obtained at step (f2) as an estimator;
at step (c), the preliminary solution is obtained from said knowledge base of the structure;
at step (c), the preliminary solution of the structure comprises a preliminary solution of each object of the structure, each obtained from the knowledge base of the corresponding object;
the knowledge base of structure is a database comprising relationships between the knowledge bases of the respective objects;
during step (f), for each object, a three-dimensional subject-specific reconstruction is obtained based on the modified preliminary solution of the first portion of object obtained at step (e), and on the knowledge base of structure;
during step (e), said preliminary solution of the first portion of object is modified by applying one or more of the following:
a three-dimensional rigid transformation to said preliminary solution of the first object,
a three-dimensional linear deformation to said preliminary solution of the first object, a three-dimensional non-linear deformation to said preliminary solution of the first object;

during step (e), said preliminary solution of the first portion of object is manually modified by an user by adapting said preliminary solution of the first portion of object to said subject-specific data for the first object;

during step (e), said preliminary solution of the first portion of object is automatically modified by calculating, from said knowledge base for the first object, a subject-specific reconstruction which matches with the subject-specific data for the first portion of object;

at step (b), the knowledge base of structure is provided from a statistical analysis of structures of the type of the body structure to be reconstructed;

at step (b), a parametric model of each object is provided, from the knowledge base of the respective objects, said parametric model comprising coordinates of control points of the model parameterized as a function of estimators of anatomical data of the object;

at step (b), a knowledge base of each object is provided, which comprises coordinates of control points of objects of the same type as the object of the structure to be reconstructed, said knowledge base being adapted to calculate coordinates of control points for the subject-specific reconstruction of a portion of object from said coordinates of control points of objects of the same type and from estimators of anatomical data parameters of the object to be reconstructed;

at step (b), a parametric model of the structure is provided from the knowledge base of the structure, said parametric model, comprising coordinates of control points of the structure, parameterized as a function of estimators of anatomical data of the structure;

at step (b), a knowledge base of the structure is provided, which comprises coordinates of control points of each object for structures of the same type as the structure to be reconstructed, said structures of the same type each comprising objects of the same type as the objects of the structure to be reconstructed, and said knowledge base being adapted to calculate coordinates of control points for the subject-specific reconstruction of the second portion of object from said coordinates of control points of portions of objects of the same type as the second portion of object and from estimators of anatomical data parameters of the structure to be reconstructed;

said preliminary solution of structure is calculated by:

(c1) fitting a subject-specific reconstruction of at least one of said objects to a corresponding item on said detection data, (c2) automatically calculating the preliminary solution of each of said objects except said at least one object from the subject-specific reconstruction of said at least one object and from said detection data;

at step (a), bi-dimensional X-ray detection data is provided;

at step (a), said subject-specific data is provided comprising at least two bi-dimensional images of the body structure taken from different orientations, and wherein, at step (e), the preliminary solution of the first portion of object is fitted to both images;

prior to step (a), subject-specific data of the structure is acquired;

at step (a), detection data of said structure is provided comprising two calibrated bi-dimensional radiographs of the body structure taken from different orientations;

steps (c)-(f) are performed iteratively, the preliminary solution used at step (c) of the subsequent iteration being obtained from subject-specific reconstruction obtained at step (f) of a previous iteration;

the first portion of object in a subsequent iteration is a different portion of object from the first portion of object in a previous iteration;

at step (d), the preliminary solution of a first object is selected, at step (e), the preliminary solution of the first object is modified, and at step (f), the three-dimensional subject-specific reconstruction of a second object is obtained;

at step (f), the three-dimensional subject-specific reconstruction of another portion of the first object is obtained;

the body structure is an osteo-articular structure, and the objects are bony objects.

According to another aspect, the invention relates to a computer program product comprising instructions for causing a programmable unit to perform the above methods when executed on said programmable unit.

According to another aspect, the invention relates to a computer program product comprising a knowledge base of a body structure, said structure comprising a plurality of objects, said knowledge base being for use in a method for reconstruction of a three-dimensional model of a subject-specific body structure based on subject-specific data, said knowledge base comprising a priori-knowledge of the body structure, previously established from structures of the same type as the subject-specific structure, said knowledge base of structure comprising a knowledge base of each object of the structure, said knowledge base of structure being adapted to estimate, from a parameter of any object of the structure, another parameter for at least one object of the structure, the knowledge base of each object being adapted to estimate, from a parameter of the respective object, a three-dimensional subject-specific reconstruction of at least a portion of the respective object.

BRIEF DESCRIPTION OF THE DRAWINGS

Other characteristics and advantages of the invention will readily appear from the following description of three of its embodiments, provided as non-limitative examples, and of the accompanying drawings.

On the drawings:

FIGS. 8a-8c are views corresponding to FIGS. 6a-6c for a third embodiment of the invention.

On the different figures, the same reference signs designate like or similar elements.

DETAILED DESCRIPTION

Figure 1:
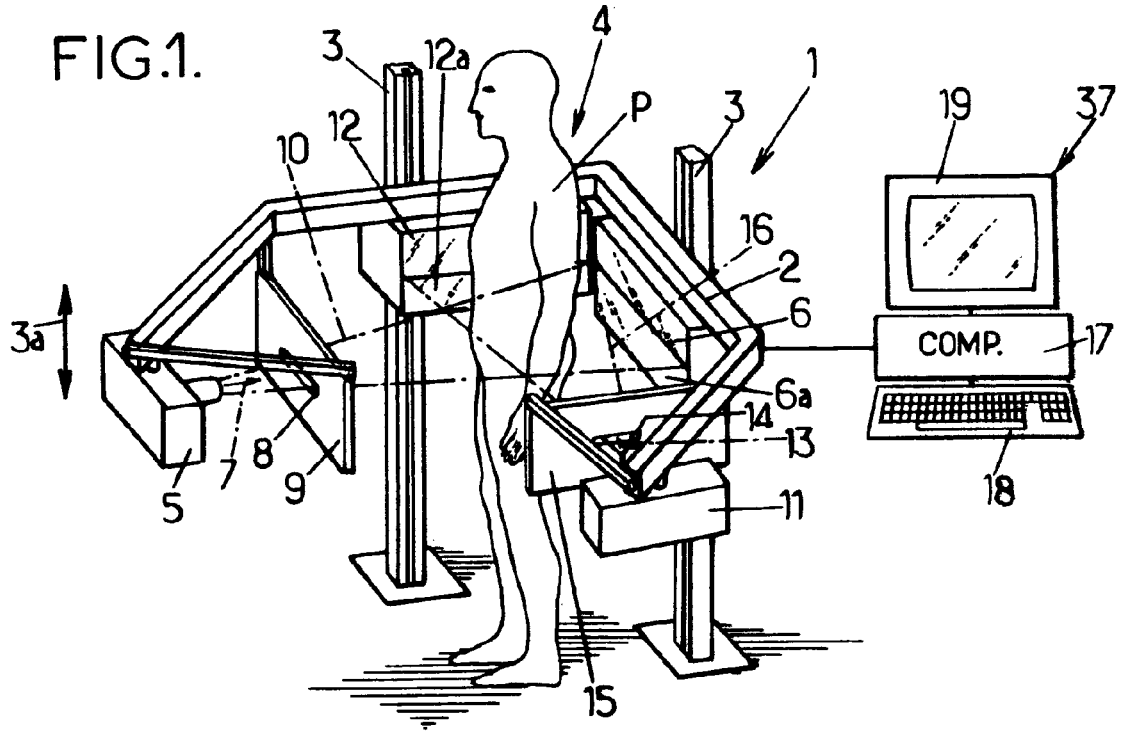
FIG. 1 is a perspective view of an example of a reconstruction apparatus.

FIG. 1 shows a radiographic apparatus 1 for three-dimensional reconstruction, the apparatus comprising a moving frame 2 displaceable under motor drive along vertical guides 3 in both directions of translation 3a.

The frame surrounds a field of observation 4 in which a patient P can be placed, e.g. standing, for observing an osteo-articular structure of the patient when in the standing position, which can be important for patients suffering from scoliosis, for example.

The moving frame 2 carries a first radiological source 5 and a first detector 6 which is placed facing the source 5 beyond the field 4, and which comprises at least one horizontal line 6a of detector cells. By way of example, the detector 6 may be a gas detector responsive to low doses of radiation, e.g. as described in documents FR-A-2 749 402 or FR-A-2 754 068. Naturally, other types of detectors may optionally be used in the context of the present invention.

The radiological source 5 is adapted to emit ionizing radiation, in particular X-rays, suitable for being detected by the detector 6 in an image-taking direction 7 that is antero-posterior relative to the patient P, the rays passing through a horizontal slit 8 made through an aiming mask 9 such as a metal plate in order to generate a horizontal beam 10 of ionizing radiation in the field of observation 4.

The moving frame 2 also carries a second radiological source 11 similar to the source 5 and a second detector 12 similar to the detector 6, disposed facing the source 11 beyond the field 4, and comprising at least one horizontal line 12a of detector cells.

The radiological source 11 is adapted to emit ionizing radiation in a image-taking direction 13 that is lateral relative to the patient P, passing through a horizontal slit 14 formed in an aiming mask 15 such as a metal plate in order to generate a horizontal beam 16 of ionizing radiation in the field of observation 4.

Naturally, there could be more than two radiological sources and detectors, and the image-taking directions of these various radiological sources could, where appropriate, be other than mutually perpendicular, and they need not even be horizontal.

The two detectors 6, 12 are connected to a computerized system 37 or some other electronic control system fitted with:
- an input interface comprising at least a keyboard 18 and generally also a mouse (not shown);
- an output interface comprising at least a screen 19;
- a processor 17 for executing a computer program adapted to implement the method described herein; and
- a knowledge base 21 of the structure to be reconstructed.

The microcomputer 37 may also be connected to the motor-driven drive means (not shown) contained in the guide 3, and to the sources 5 and 11, so as to control vertical displacement of the frame and the emission of ionizing radiation.

By way of example, the reconstruction method which is described after is a reconstruction method of the human spine using a knowledge base of spines. However, this method could be used for reconstruction of any structure of the body such as osteo-articular structures comprising a plurality of bony objects, such as for example, the upper limb, the lower limb, the hip, or even part or totality of the skeleton, when a knowledge base of the structure to be reconstructed is provided. The structure could thus comprise as few as two objects such as for example a femur and a tibia.

Figure 2:
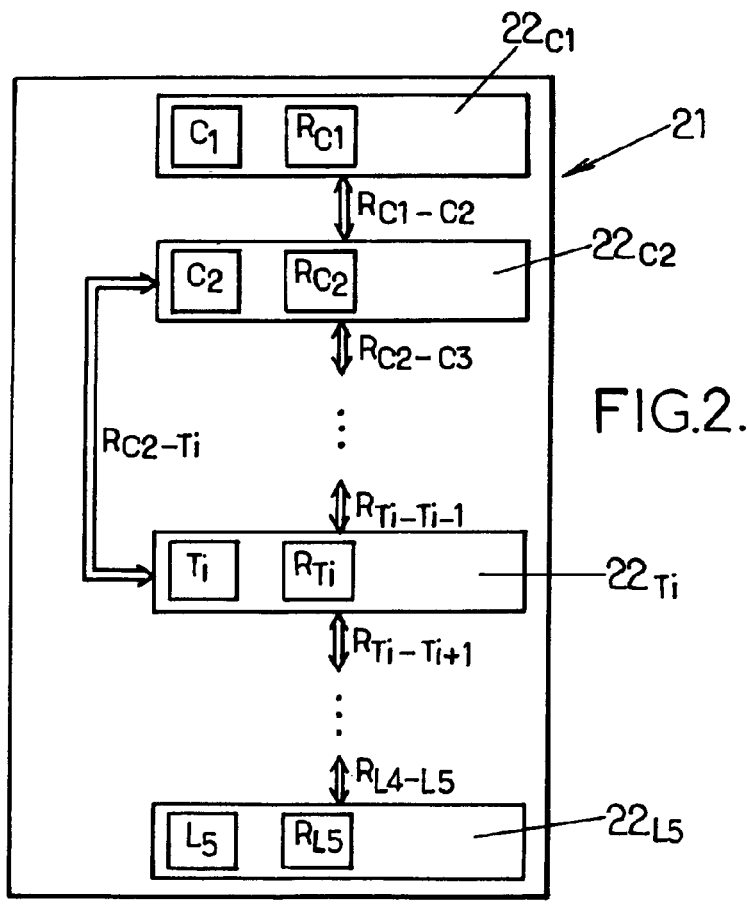
FIG. 2 is a schematic view of an example of a database of a structure to be reconstructed.

As an example shown on FIG. 2, the knowledge base 21 of the structure comprises a database of each of the objects of the structure to be reconstructed. In the example, where the structure to be reconstructed is the spine, the knowledge base 21 comprises a database of each of the vertebral bodies. As shown on FIG. 2, the database of the structure 21 comprises the database $22_{c1}$ of the first cervical vertebra, a database $22_{C2}$ of the second cervical vertebra, . . . a database of each other vertebra, (e.g. a database $22_{Ti}$ of the $i^{th}$ thoracic vertebra for the $i^{th}$ vertebra), . . . , and a database $22_{L5}$ of the fifth lumbar vertebra.

For each object, namely for each vertebra, the database for the object can be constructed as or from a data obtained from objects similar to the object to be reconstructed.

Figure 3:
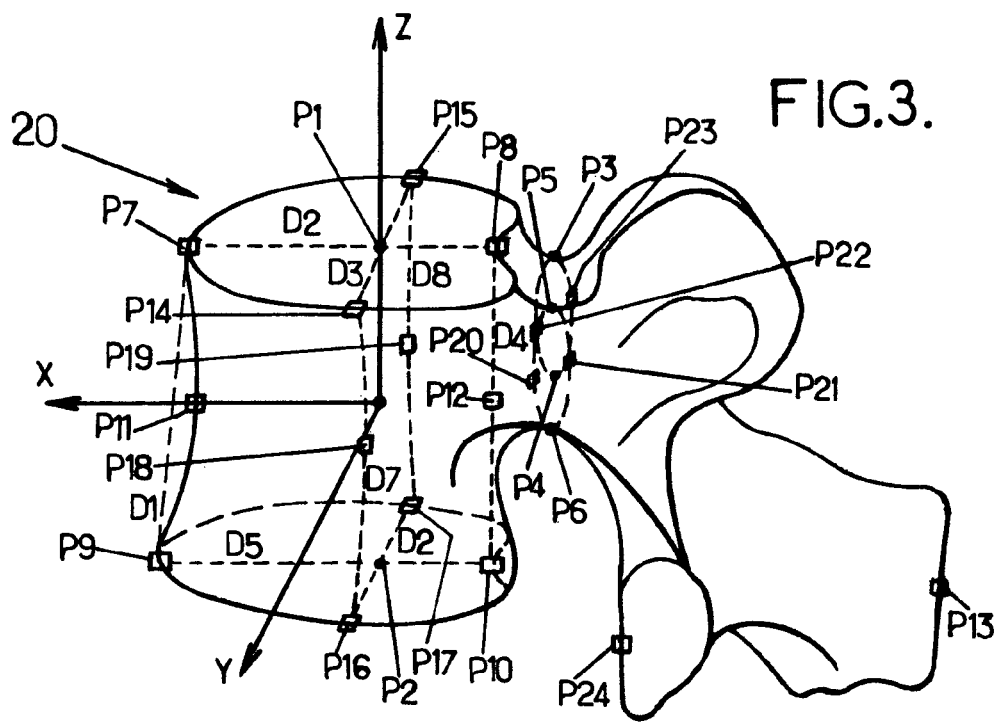
FIG. 3 is a perspective view of an example of a generic representation of an object of a structure.

The database may contain data relating to particular reference marks on objects of the same type of the object to be reconstructed, acquired beforehand, for example by computer tomography. By way of example, the database of the $i^{th}$ vertebra Ti contains the positions of characteristic points P1, . . . P23 for the $i^{th}$ vertebra of each of a plurality of patients, characteristic lengths D1 . . . D8 for each vertebra, as shown in FIG. 3, segments, straight lines or arcs that are characteristics of the object, and/or outlines and edges of these particular vertebra.

The coordinates of characteristic points or lines may be expressed, for example, in a local X, Y, Z frame of reference. In the example described, the axis Z corresponds to the axial direction of the vertebral column, the axis X is determined so as to define the antero-posterior plane of the vertebra 20 along with axis Z, the axis Y being perpendicular to the above-mentioned axes X and Z. In addition, the origin O of the frame of reference is disposed in the middle between the two axial end faces of the main "tubular" portion of the vertebra, the origin O also being positioned so that the axis Z passes through the upper axial face of the main portion of the vertebra at a reference feature P1 such that the distance between said reference feature P1 to the front end P7 of said axial face is equal to about two-thirds of the total distance between the front and rear ends P7 and P8 of the antero-posterior section of said top axial face.

With this database of isolated vertebras, relationships between parameters within the vertebra can also be calculated. The database of vertebra Ti thus comprises means $R_{Ti}$ for calculating, from one or more estimators for the vertebra being currently reconstructed, the coordinates of points P1-P23 and/or other geometric data, by statistical inference on the database of vertebras $T_i$. It is also possible to establish a subset of the database of vertebrae belonging to healthy individuals or to individuals suffering from scoliosis, and similarly it is possible to characterize each vertebra as a function of the weight, the size, the age, or any other type of parameter concerning the individual that is deemed to be necessary.

Alternatively, the knowledge base may comprise a mathematical model constructed from the previously acquired data. By way of example, the knowledge base may include statistical data $R_{Ti}$ (means, variances, . . . ) for each parameter of the knowledge base, or indeed mathematical equations for determining from the knowledge base of a given vertebra $T_i$, the positions of the characteristic points for a subject-specific reconstruction on the basis of values of estimator parameters for said object. For example, the coordinates of the control points will be parameterized by functions of these parameters.

The knowledge base can also contain data relating to the position of a given vertebra in the vertebral column of the subject submitted to the CT-scan to enter its vertebra into the database, such as, for example, the angular orientation of the vertebra and the curvature of the spinal column at the level of that vertebra.

For example, the knowledge base will comprise geometrical information which is known a priori, such as a prerequisite that a given vertebral endplate will be orthogonal to the spinal center line.

A generic model of each vertebra is also available, for example established from the database as an average vertebra for that vertebral level. The generic model is defined as a mesh of several hundred to several hundred thousand points of a mean vertebra $T_i$. A generic model can be provided for each type of vertebra, for example.

The knowledge base of the structure further comprises relationships between the above-described models of objects. For example, relationships between vertebra $T_i$ and vertebra will be identified on FIG. 2 by reference $R_{Ti\text{-}Ti\text{-}1}$. It is not necessarily only neighbouring vertebras which have pre-established relationships. For example, the relationship $R_{C2\text{-}Ti}$ describes a relationship between vertebra $C_2$ and vertebra $T_i$. For example, a knowledge base of vertebras C2 and a knowledge base of vertebras Ti are established from detection data previously obtained from whole spines. Relationships linking characteristic dimensions or coordinates of these two vertebras are also linked together for each spine. For example, the knowledge base of the structure will comprise means for calculating specific coordinates or geometrical characteristics of a given vertebra Ti by statistical inference on the knowledge base of structure based on an estimator which is provided by estimating a geometrical characteristic of another vertebra $T_k$.

Alternately, coordinates of control points P1-P23 of each given vertebra could be provided as parameterized by functions of geometrical parameters for both the given vertebra and neighbouring vertebra.

Thus, the knowledge base of each object comprises a priori knowledge of this object, and the knowledge base of the structure comprises a priori knowledge of the structure in the form of a priori knowledge of each object and of relationships between the objects.

The above-described apparatus operates as follows:

The microcomputer 37 is used initially to take two radiographic images of the patient P by causing the field of observation 4 to be scanned by the beams 10 and 16 of ionizing radiation over a height corresponding to the structure of the patient that is to be observed, for example the spine and the pelvis, or indeed the entire skeleton. For this purpose, the frame is preferably displaceable over a height of not less than 70 centimeters (cm), and preferably over at least one meter.

Figure 4:
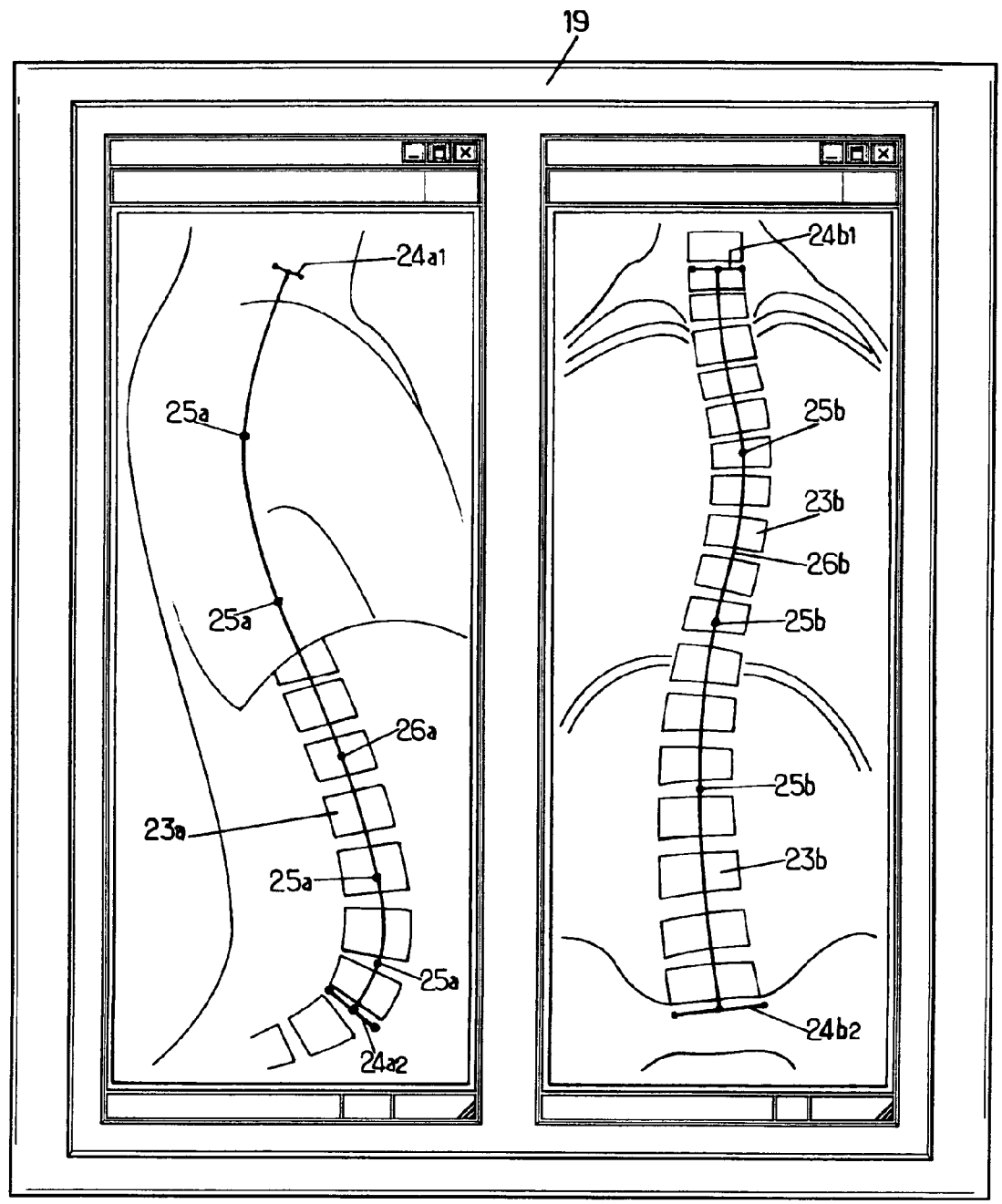
FIG. 4 is a schematic view of a computer screen showing detection data of the structure.

During this movement, two calibrated digital radio-graphic images of the portion of the patient under examination are stored in the memory of the microcomputer 37, for example an antero-posterior image and a lateral image respectively, which images can be viewed on the screen 19 of the microcomputer, as shown in FIG. 4.

Bidimensional detection data of the structure, such as an antero-posterior and a lateral radiographs obtained by the apparatus of FIG. 1, is displayed on a screen 19 of the computerized system 37 as shown on FIG. 4. Although detection data of the objects are clearly shown on FIG. 4, which is a schematic representation, it should be understood that detection data such as radiographs, do not necessarily provide with such a clear representation of the structure. This is illustrated by the presence of the arm and lung on the lateral view which hides most of the upper spine in this view. Projections of the objects of the structure of the patient are identified by reference number 23b on the frontal image (right side of FIG. 4), and 23a on the lateral image (left side of FIG. 4). The projections 23a, 23b of all of the objects of the structure form all together the projection of the structure.

From this detection data, a preliminary solution for a subject-specific reconstruction of a first object of the structure is calculated. The preliminary solution could for example be obtained as follows:

on each of the images of FIG. 4, characteristic geometrical data of the structure to be reconstructed will be identified, automatically by image processing, or manually by an user. In an example of embodiment, illustrated on FIG. 4, an end user will identify on each of the images the projections 24a1, 24a2, 24b1, 24b2 of the lowermost and the uppermost vertebral endplates of the structure to be reconstructed. Using the input interface 18, the user will also identify a few points 25a, 25b of the projection on each image of the central line of the vertebral spine. On each image, a line 26a, 26b is extrapolated from the positions in the image of points 25a, 25b, respectively, for example without using any a priori knowledge of the shapes of such central lines.

using calibration data for the images (calibration data which is for example provided by the fact that the two acquisitions are performed using a single frame), a three-dimensional curve is calculated from the two-dimensional curves calculated for the respective images of FIG. 4. Methods for calculating the three-dimensional shape of the line from the two bi-dimensional lines 26a, 26b in a calibrated environment are well known to the person of the art.

the orientations of the endplates are also determined in three-dimensions based on the orientations of the projections 24a1, 24b1 of the uppermost endplates in both images using the same method. The preliminary solution for the subject-specific reconstruction of the uppermost object is obtained by positioning in three-dimensional space a generic model of vertebra C1 based on the orientation of the uppermost endplate calculated at the preceding step. This generic model is for example obtained as an average C1 vertebra from the database $22_{c1}$ of vertebra C1.

alternately, the first object could be the lowermost object. In this alternative, the preliminary solution for the subject-specific reconstruction of the lowermost object $L_5$ is obtained in the same way based on the position and orientation in 3D space of the endplates from their projection 24a2, 24b2, and on a generic model of L5 obtained from the database of L5.

the preliminary solution for a subject-specific reconstruction of the whole structure is obtained directly from the preliminary solution for the subject-specific reconstruction of the uppermost and/or the lowermost objects.

For example, the length of the three-dimensional central line of the spine is calculated, and the positions of the subject-specific reconstruction of the intermediate objects are calculated as being regularly spaced along said line, based on the position of the preliminary solution of the subject-specific reconstruction of the first (lowermost or uppermost) object as a parameter: this (these) positions will be used to determine the positions for the preliminary solution of the subject-specific reconstruction of the intermediate objects.

The orientation of the preliminary solution of the subject-specific reconstruction of each object is calculated from the orientation of the tangent to the three-dimensional central line at the calculated position, and of the relative orientations of tangent to the three-dimensional central line above and under the calculated position.

The positions of the preliminary solution of the subject-specific reconstruction of each object could be determined in other ways. For example, the subject-specific reconstructions of objects will not be regularly spaced along the three-dimensional central line, but will be placed irregularly along this line. These positions could for example be estimated from a non-linear function. This non-linear function will for example be calculated beforehand by taking into account a priori knowledge of the structure. For example, the non-linear function will take into account the a priori spacing of consecutive vertebra. For example, the relative positions could be obtained by statistical inference on the knowledge base 21 of structure, taking as estimators the length of the three-dimensional line, and the three-dimensional orientation of the uppermost and lowermost vertebral plates, and/or other parameters of the patient such as height, weight, etc. In order to do so, a priori knowledge would be provided by the relationships $R_{c1-c2}, \ldots, R_{L4-L5}$ of the knowledge base 21 of structure.

The orientations of each of the preliminary solutions of the subject-specific reconstructions of the objects could also be obtained likewise by statistical inference on the knowledge base of structure using the orientation of a previously reconstructed object as an estimator.

Given the position and orientation of the preliminary solution of the subject-specific reconstructions of each object, the preliminary solution of the subject-specific reconstruction itself for each object 28 is obtained by calculating the three-dimensional coordinates of points of the subject-specific reconstruction of each object based on the above calculated positions and orientations, such as for example, by statistical inference on the knowledge base of each respective object, using these positions and orientations as estimators. Namely, for a given vertebra $T_i$ the positions in three dimensional space of points P1-P23 will be calculated from the knowledge base of the vertebra $T_i$, using the estimated position and orientation as an estimator by statistical inference on the database of $T_i$. Further, the generic model of $T_i$ is deformed or displaced to fit with the coordinates of points P1-P23 in 3D space.

Figure 5:
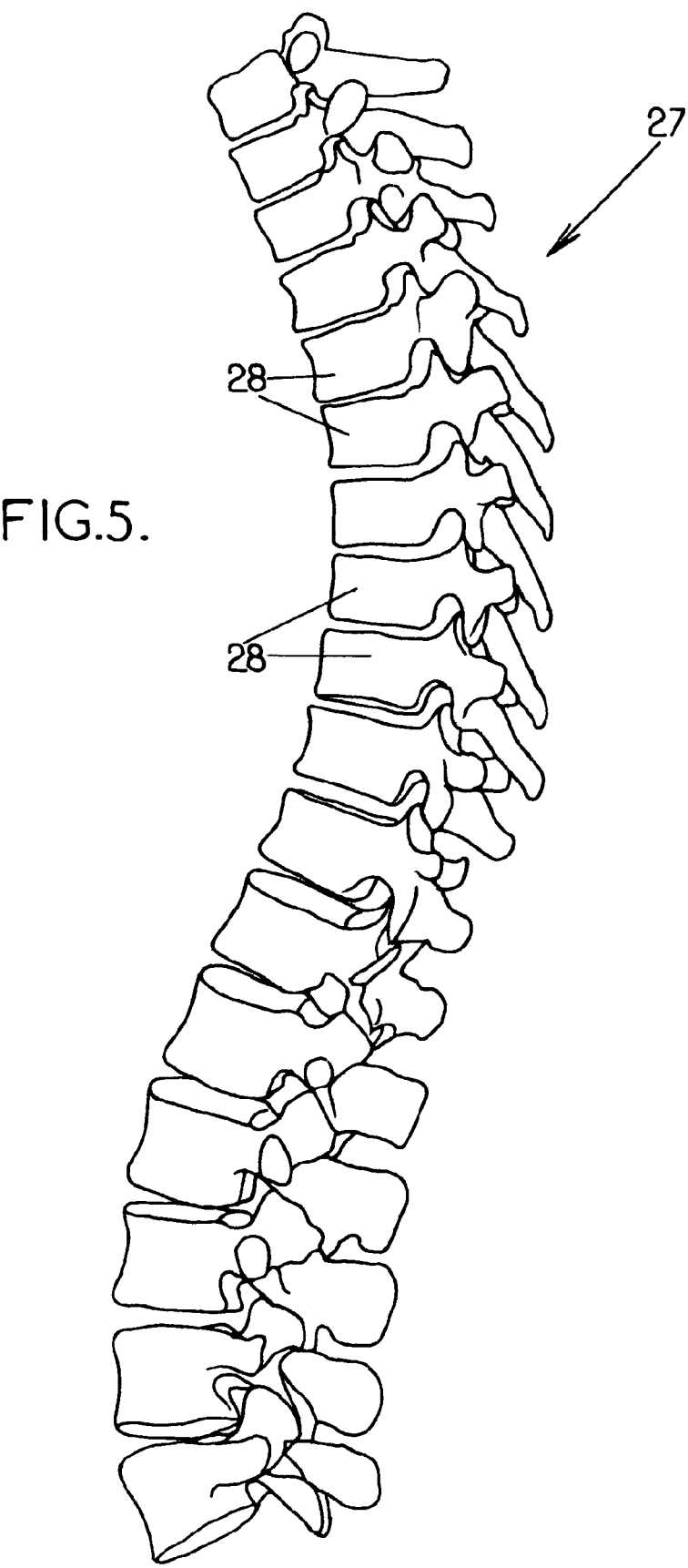
FIG. 5 is a schematic perspective view of a preliminary solution for a subject-specific reconstruction of the structure for which detection data was shown on FIG. 4.

The obtained three-dimensional preliminary solution for a subject-specific reconstruction of each object 28 is represented on FIG. 5. They all together constitute the preliminary solution of the subject-specific reconstruction 27 of the structure.

This preliminary solution of the subject-specific reconstruction is not necessarily accurate enough, depending on the intended application, such as assistance to diagnostic, pre or post operative planning, real time navigation, . . . .

Thus, the reconstruction of FIG. 5, obtained as described above, could be considered as a preliminary solution for implementing the steps which will be described below in relation to FIGS. 6a-6c, 7a-7c, or 8a-8c.

Namely, within the scope of the invention, it should be understood that, by "preliminary solution" it is meant a subject-specific reconstruction having a given accuracy, and that a method will be applied to this "preliminary solution" to obtain a more accurate subject-specific reconstruction. This more accurate subject-specific reconstruction could still itself be considered as a "preliminary solution" for a further implementation of the method in view of obtaining a further refined construction.

The following steps are thus applied on the reconstruction of FIG. 5, considered as a "preliminary solution". However, these steps need not necessarily be performed on a "preliminary reconstruction" obtained in the way described above in relation to FIG. 4-5.

Figure 6C:
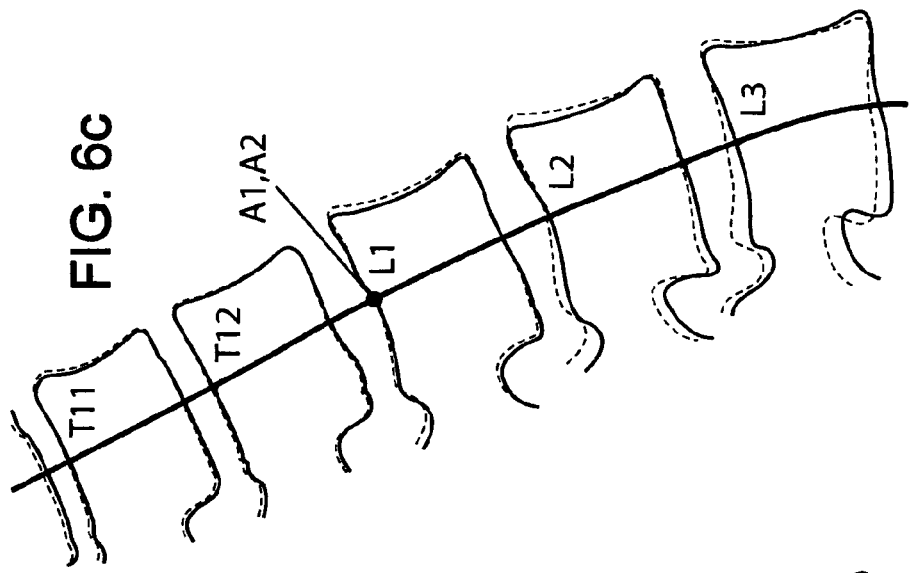
FIG. 6c is a view corresponding to FIG. 6a after the preliminary solution for the subject-specific reconstruction for vertebra L1 has been fitted to detection data for L1.
Figure 6B:
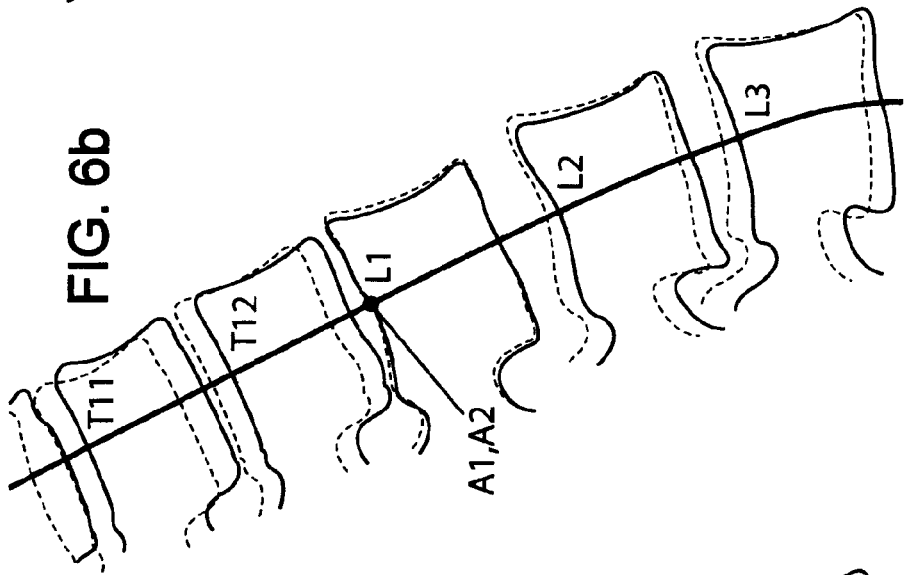
FIG. 6b is a view corresponding to FIG. 6a of the fitting of the preliminary solution for the subject-specific reconstruction for vertebra L1 to detection data for L1, by rigid displacement.
Figure 6A:
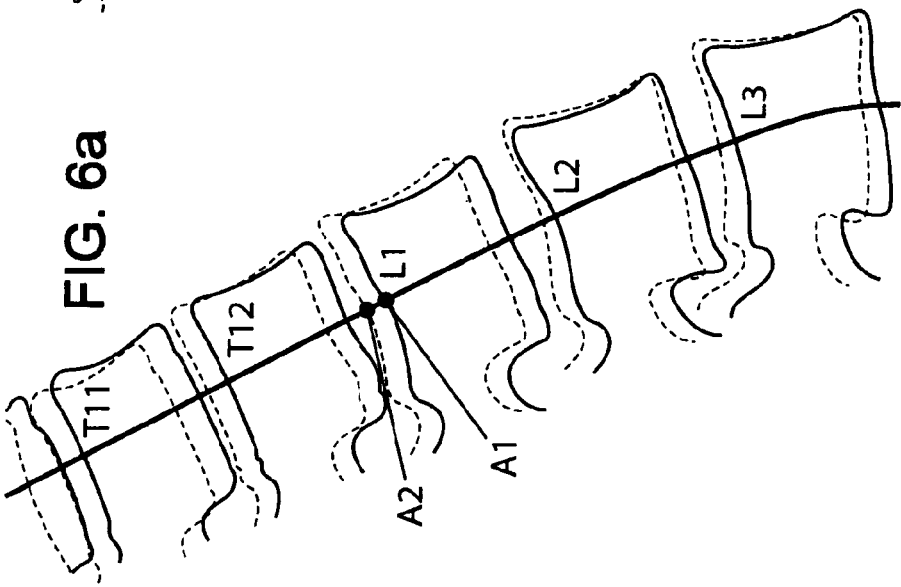
FIG. 6a is a schematic partial view of a computer screen showing both the detection data for each object (in dotted lines), as well as the projection of the preliminary solution for the subject-specific reconstruction of FIG. 5 in the plane of the detection data.

FIG. 6a schematically represents a part of the left window of the computer display 19, wherein the detection data of the structure is partly represented in dotted lines. It should be observed that this detection data could for example be provided in the form of a radiograph, and that the outline of the projected object is not necessarily as clear as shown on FIG. 6a in the application of the herein described method. Further, a projection of the preliminary solution for the subject-specific reconstruction of the structure onto the detection plane is also displayed on FIG. 6a in continuous lines. This projection is for example obtained by simulating the tangency of X-rays on the subject-specific reconstruction of the structure. As explained above, this preliminary solution is for example the reconstruction of FIG. 5. As shown on FIG. 6a, the preliminary solution is not necessarily very well fitted to the detection data. In order to fit the subject-specific reconstruction on the detection data, one of the objects is selected. For example, vertebra L1 is selected because it is estimated or calculated that its initial solution is very distant from the corresponding detection data, or for any other reason, such as that very accurate detection data are provided for L1. The subject-specific reconstruction of the first object (L1) of the preliminary solution is modified. For example, a first point A1 is identified on the projection of the preliminary solution for L1, and a similar point in the detection data is identified as A2 on the display screen. This identification on the lateral view could be performed either by a user with input means 18, or by computerized numerical treatment of images. Possibly, the same steps are accomplished, for the same vertebra, on the frontal view displayed in the right window of the computer screen (not shown).

As shown on FIG. 6b, the subject-specific reconstruction for L1 is obtained by modifying the preliminary solution so that points A1 and A2 are brought into concordance.

The modification to the preliminary solution could for example be, in this example, a rigid displacement of the subject-specific reconstruction of L1 by applying a translation and/or a rotation in 3D space to the preliminary solution. For example, the displacement in 3D space of the initial solution for L1 which enables bringing in correspondence A1 with A2, and simultaneously similar points in the frontal view, is calculated.

The subject-specific reconstruction of at least another object is automatically obtained from the above-described modification. For example, if one considers thoracic vertebra T12 as the second object, the subject-specific reconstruction for T12 is obtained, from the preliminary solution for T12 shown on FIG. 6a, by modifying this preliminary solution on the basis of the modifications applied to the subject-specific reconstruction of L1. In order to do so, the knowledge base of structure 21 is used, and in particular the relationship $R_{L1-T12}$ between vertebrae L1 and T12. For example, the new position and/or orientation of the subject-specific reconstruction of L1 in FIG. 6b will provide a parameter of object L1, to be used as an estimator for obtaining another estimator of object T12 such as the position and/or orientation and/or shape of the subject-specific reconstruction of T12 by statistical inference on the knowledge base of structure 21. Possibly, this calculation will also take into account the position and/or orientation of the preliminary solution for vertebra T11, using relationship $R_{T11-T12}$ between vertebra $T_{11}$ and $T_{12}$ in the knowledge base of structure. Possibly, other objects will also be taken into account.

Once this position, orientation, and/or parameter of shape for the subject-specific reconstruction of T12 is obtained as described above, the subject-specific reconstruction in three-dimensional space of T12 is obtained from the knowledge base of T12, for example by statistical inference on this knowledge base using the determined characteristic (position, orientation, parameter of shape) as an estimator.

This step, which is described for vertebra T12 based on the fit of vertebra L1 could simultaneously be performed for all the other objects to be reconstructed in order to obtain the subject-specific reconstruction of the structure, a projection of which in the detection data plane is shown on FIG. 6c. This implies that the knowledge base of the structure is adapted to estimate a parameter for each of the vertebra from the parameter of L1.

As shown on FIG. 6c, this method will provide more accurate subject-specific reconstruction for objects neighbouring the subject-specific reconstruction of the originally modified object than for more remote objects. Thus, this method could be performed iteratively, on different objects, using a previously obtained reconstruction as a "preliminary solution", until a satisfying subject-specific reconstruction for the structure as a whole is obtained. This implies that the knowledge base of the structure has means to estimate a parameter for at least a second object for each of the first objects.

Figure 7C:
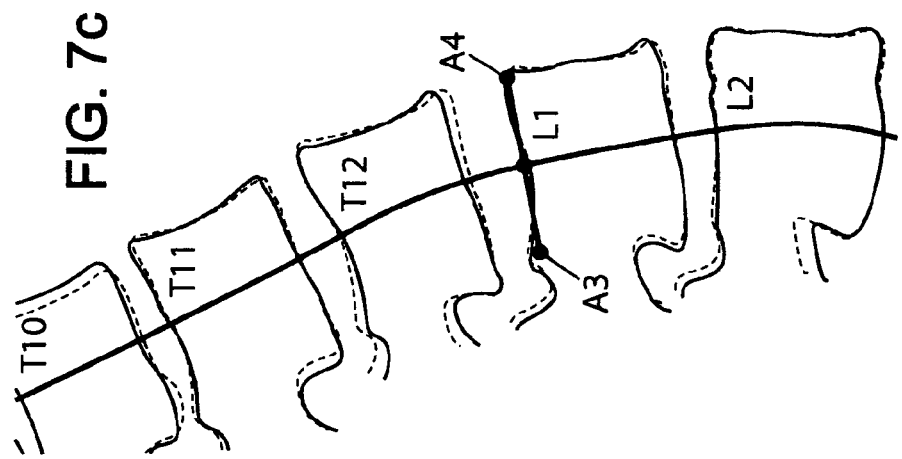
FIG. 7c is a view corresponding to FIG. 7a after the preliminary solution for the subject-specific reconstruction for vertebra L1 has been fitted to detection data for L1.
Figure 7B:
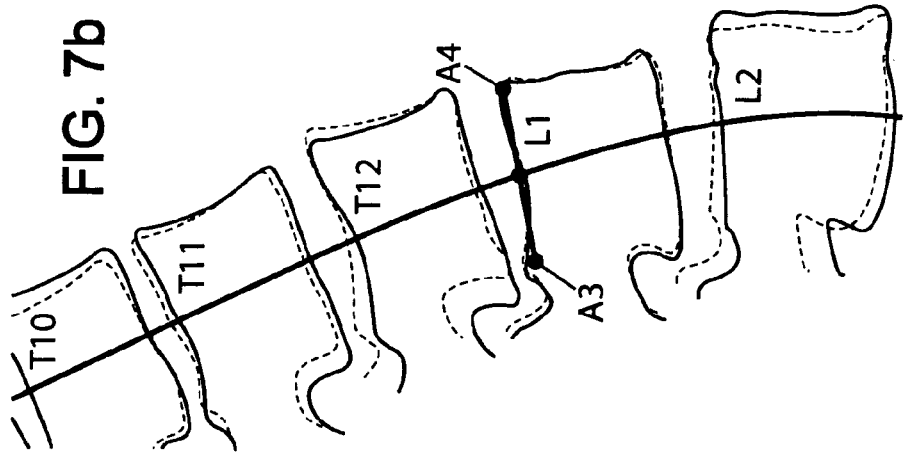
FIG. 7b is a view corresponding to FIG. 7a of the fitting of the preliminary solution for the subject-specific reconstruction for vertebra L1 to detection data for L1 by non-rigid deformation.
Figure 7A:
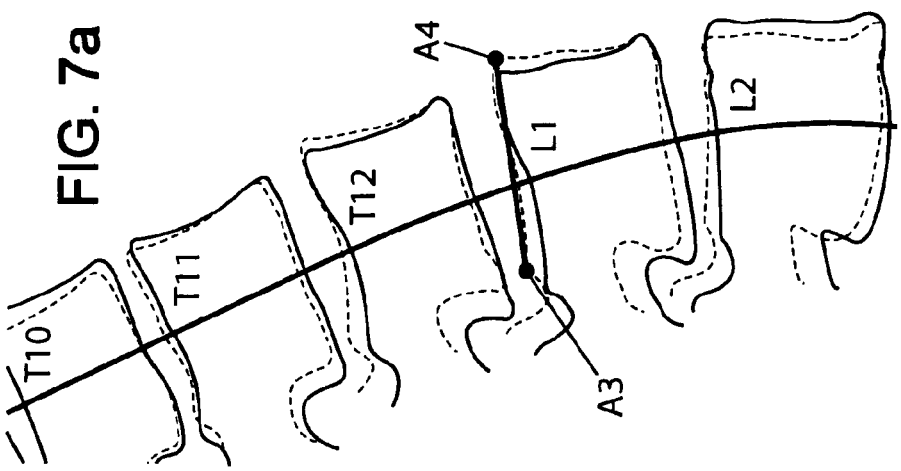
FIG. 7a is a view corresponding to FIG. 6a for an other body structure.

FIG. 7a schematically represents a part of the left window of the computer display 19, wherein the detection data of another structure is partially represented in dotted lines. Further, a projection of the preliminary solution for the subject-specific reconstruction of the structure onto the detection plane is also displayed on FIG. 7a in continuous lines. In order to fit the subject-specific reconstruction on the detection data, one of the objects is selected. For example, vertebra L1 is selected. The subject-specific reconstruction of the first object (L1) of the preliminary solution is modified. For example, two points A3, A4 are identified on the projection of the preliminary solution for L1, and similar points in the detection data are identified (not shown) on the display screen. Possibly, the same steps are accomplished, for the same vertebra, on the frontal view displayed in the right window of the computer screen.

As shown on FIG. 7b, the subject-specific reconstruction for L1 is obtained by modifying the preliminary solution so that points A3 and A4 are brought into concordance with the corresponding points in the detection data.

The modification to the preliminary solution could for example be, in this example, linear deformation of the subject-specific reconstruction of L1 by applying a homothetic transformation and/or a rotation to the initial solution.

The subject-specific reconstruction of at least another object is automatically obtained from the above-described modification. For example, if one considers thoracic vertebra T12 as the second object, the subject-specific reconstruction for T12 is obtained, from the preliminary solution for T12 shown on FIG. 7a, by modifying this initial solution on the basis of the modifications applied to the subject-specific reconstruction of L1. In order to do so, the knowledge base of structure 21 is used, and in particular the relationship $R_{L1-T12}$ between vertebrae L1 and T12. For example, the new position, orientation and shape of the subject-specific reconstruction of L1 will provide a parameter of object L1 to be used as an estimator for the position, orientation and shape of the subject-specific reconstruction of T12 by statistical inference on the knowledge base of structure 21.

Once this position, orientation, and/or parameter of shape for the subject-specific reconstruction of T12 is obtained as described above, the subject-specific reconstruction in three-dimensional space of T12 is obtained from the knowledge base $22_{T12}$ of T12, for example by statistical inference on this knowledge base using the determined characteristics (position, orientation and shape parameter) as estimators.

This step, which is described for vertebra T12 could be automatically reproduced for all the objects to be reconstructed in order to obtain the subject-specific reconstruction of the structure, a projection of which in the detection data plane is represented on FIG. 7c.

As shown on FIG. 7c, this method will provide an accurate subject-specific reconstruction for objects neighbouring the subject-specific reconstruction of the originally modified object. This method could be performed a given number of times, on different objects, until a satisfying subject-specific reconstruction for the structure as a whole is obtained.

Although the two above examples consider whole bony bodies as objects, it is possible, according to a third embodiment, to obtain a subject-specific reconstruction of a portion of object based on the modification of a portion of another object, or even of the same object. The knowledge base is adapted to estimate a parameter of a portion of an object, for example the lower endplate of vertebra T12, from a parameter of a portion of an object, for example the upper endplate of vertebra L1, for example based on a relationship $R_{L1u-T12l}$ between these two parameters.

FIG. 8a schematically represents a part of the left window of the computer display 19, wherein the detection data of another structure is partially represented in dotted lines. Further, a projection of the preliminary solution for the subject-specific reconstruction of the structure onto the detection plane is also displayed on FIG. 8a in continuous lines. In order to fit the subject-specific reconstruction on the detection data, a portion of one of the objects is selected. For example, the upper endplate of vertebra L1 is selected. The subject-specific reconstruction of the first portion of object (upper endplate of L1) of the preliminary solution is modified. For example, one point A5 is identified on the projection of the preliminary solution for the upper endplate L1, and a similar point in the detection data is identified as A6 on the display screen. Possibly, the same steps are accomplished, for the same vertebra, on the frontal view displayed in the right window of the computer screen.

As shown on FIG. 8b, the subject-specific reconstruction for the upper end plate of L1 is obtained by modifying the preliminary solution so that point A5 is brought into concordance with the corresponding point A6 in the detection data.

The modification to the preliminary solution could for example be, in this example, by manually displacing the initial solution of the subject-specific reconstruction of the upper endplate of L1.

The subject-specific reconstruction of at least another portion object is automatically obtained from the above-described modification. For example, if one considers the lower vertebral endplate of vertebra T12 as the second portion of object, the subject-specific reconstruction for this second portion of object is obtained, from the preliminary solution for this second portion of object shown on FIG. 8a, by modifying this initial solution on the basis of the modifications applied to the subject-specific reconstruction of the upper endplate of L1. In order to do so, the knowledge base of structure 21 is used and in particular the relationship $R_{L1u-T12l}$ between the upper endplate of vertebrae L1 and the lower endplate of T12. For example, the new position, orientation and shape of the subject-specific reconstruction of the upper endplate of L1 will provide a parameter of this portion of object to be used as an estimator for the position, orientation and shape of the subject-specific reconstruction of the lower vertebral endplate of T12 by statistical inference on the knowledge base of structure 21.

Once this position, orientation, and/or parameter of shape for the subject-specific reconstruction of the lower endplate of T12 is obtained as described above, the subject-specific reconstruction in three-dimensional space of T12 is obtained from the knowledge base $22_{T12}$ of T12, for example by statistical inference on this knowledge base using the determined characteristics (position, orientation and shape parameter) as estimators.

This step, which is described for vertebra T12 could be automatically reproduced for all the objects to be reconstructed, including object L1, in particular its lower end plate, in order to obtain the subject-specific reconstruction of the structure, a projection of which in the detection data plane is represented on FIG. 8c.

As shown on FIG. 8c, this method will provide an accurate subject-specific reconstruction for portions of objects neighbouring the subject-specific reconstruction of the originally modified object. This method could be performed a given number of times, on different portions of objects, until a satisfying subject-specific reconstruction for the structure as a whole is obtained.

It should be noted that although one modification of the preliminary solution was described for examples of FIG. 6a-c, FIG. 7a-c and FIG. 8a-c, it would be possible to define more than one modification of the preliminary solution such as for example a displacement of L1 and a deformation of a portion of T3, before the subject-specific reconstruction of the whole structure is calculated taking into account these two modifications. Further, each modified preliminary solution could provide a set of parameters, comprising one or more parameters which are used to estimate a set of parameters, comprising one or more parameters, for the subject-specific reconstruction of the second object.

The subject-specific reconstruction obtained using the above-described method could be, in a last step, further refined by applying a non-linear rigid transformation such as kriging, such as for example described in Trochu, "A contouring program based on dual kriging interpolation", Engineering with Computers, 9(3), 160-177, 1993, or any other suitable method.

The method which was described above was by way of example only. The structure to be studied is not necessarily the spine, but could be any part of the body skeleton of a patient, either in a lying or standing position. The method was described using radiographs as a detection data. However, any other kind of suitable detection data, either bi-dimensional or three-dimensional could be used within the scope of the invention. The data used is even not necessarily detection data, but could for example be any subject-specific data. Further, in the described example, the initial solution of the subject-specific reconstruction was a three-dimensional initial solution, but the invention is not intended to be limited to the specific embodiment, and a three-dimensional subject-specific reconstruction could for example be obtained from a bi-dimensional initial solution.

Figure 9:
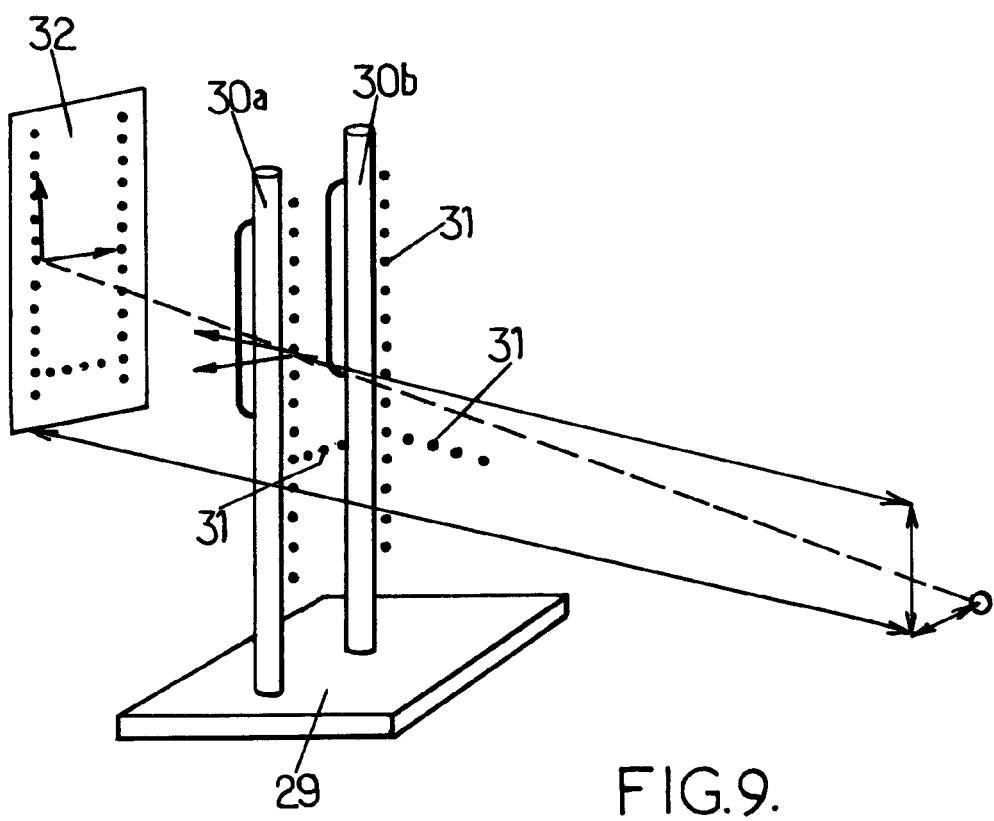
FIG. 9 is a schematic perspective view of another possible embodiment for an installation.

In particular, the acquisition scheme is not limited to the one presented in relation to FIG. 1, wherein a lateral and an antero-posterior images of the structure are obtained simultaneously. One could use other kind of acquisition apparatus, such as the one shown on FIG. 9 comprising a platen 29 and two posts 30a, 30b extending vertically and comprising radio-opaque markers 31 positioned in three-dimensional space so that their detection on the obtained detection data 32 will be used for calibrating the images respective to each other. The platen 29 will be movable relative to the radiological source in order to take a plurality of images of the patient standing on the platen along different orientations.

The invention claimed is:

1. A method for reconstruction of a three-dimensional model of a body structure of a subject, said structure comprising a plurality of objects, wherein
   (a) bi-dimensional subject-specific detection data of said structure is provided,
   (b) a knowledge base of said structure is provided, said knowledge base comprising a priori knowledge of the structure, previously established from structures of the same type as the structure to be reconstructed, said knowledge base of structure comprising a knowledge base of each object of said structure, the knowledge base of each object thus comprising a priori knowledge of the respective object, previously established from objects of the same type as the respective object, the knowledge base of said structure being adapted to estimate, from a parameter of any object of the structure, another parameter for at least an object of the structure,
   (c) a three-dimensional preliminary solution of the structure is obtained,
   (d) the preliminary solution of at least a first portion of an object is selected from the preliminary solution of the structure,
   (e) the preliminary solution of at least the first portion of object is modified to be brought in concordance with said subject-specific detection data,
   (f) at least a three-dimensional subject-specific reconstruction of at least a second portion of object is obtained based on the modified preliminary solution of the first portion of object obtained at step (e), and on the knowledge base of said structure.

2. A method for reconstruction according to claim 1 wherein, during step (f),
   (f1) a first set of parameters of the first object is obtained from the modified preliminary solution of the first portion of object obtained at step (e),
   (f2) the knowledge base provides, from the first set of parameters, a second set of parameters for at least the second portion of object, and
   (f3) the subject-specific reconstruction of the second portion of object is obtained based on the second set of parameters and on the knowledge base for objects comprising the second portion.

3. A method for reconstruction according to claim 2 wherein the parameters are geometrical parameters of a feature of the preliminary solution of the first portion of object representing an anatomical feature of the first portion of object.

4. A method for reconstruction according to claim 2 wherein, during step (f2), the second set of parameters for the subject-specific reconstruction of the second portion of object is calculated by statistical inference on the knowledge base of structure using the first set of parameters of the first portion of object as an estimator.

5. A method for reconstruction according to claim 2 wherein during step (f3), the subject-specific reconstruction of the second portion of object is obtained by statistical inference on the knowledge base of objects comprising the second portion of object, using the second set of parameters for the subject-specific reconstruction of the second portion of object obtained at step (f2) as an estimator.

6. A method for reconstruction according to claim 1, wherein, at step (c), the preliminary solution is obtained from said knowledge base of structure.

7. A method for reconstruction according to claim 6 wherein at step (c), the preliminary solution of the structure comprises a preliminary solution of each object of the structure, each obtained from the knowledge base of the corresponding object.

8. A method for reconstruction according to claim 1, wherein the knowledge base of structure is a database comprising relationships between the knowledge bases of the respective objects.

9. A method for reconstruction according to claim 1, wherein, during step (f), for each object, a three-dimensional subject-specific reconstruction is obtained based on the modified preliminary solution of the first portion of object obtained at step (e), and on the knowledge base of structure.

10. A method for reconstruction according to claim 1, wherein, during step (e), said preliminary solution of the first portion of object is modified by applying one or more of the following:
- a three-dimensional rigid transformation to said preliminary solution of the first object,
- a three-dimensional linear deformation to said preliminary solution of the first object,
- a three-dimensional non-linear deformation to said preliminary solution of the first object.

11. A method for reconstruction according to claim 1, wherein, during step (e), said preliminary solution of the first portion of object is manually modified by an user by adapting said preliminary solution of the first portion of object to said subject-specific data for the first object.

12. A method for reconstruction according to claim 1 wherein, during step (e), said preliminary solution of the first portion of object is automatically modified by calculating, from said knowledge base for the first object, a subject-specific reconstruction which matches with the subject-specific data for the first portion of object.

13. A method for reconstruction according to claim 1, wherein, at step (b), the knowledge base of structure is provided from a statistical analysis of structures of the type of the body structure to be reconstructed.

14. A method for reconstruction according to claim 1, wherein, at step (b), a parametric model of each object is provided, from the knowledge base of the respective object, said parametric model comprising coordinates of control points of the model parameterized as a function of estimators of anatomical data of the object.

15. A method for reconstruction according to claim 1 wherein, at step (b), a knowledge base of each object is provided, which comprises coordinates of control points of objects of the same type as the object of the structure to be reconstructed, said knowledge base being adapted to calculate coordinates of control points for the subject-specific reconstruction of a portion of object from said coordinates of control points of objects of the same type and from estimators of anatomical data parameters of the object to be reconstructed.

16. A method for reconstruction according to claim 1, wherein, at step (b), a parametric model of the structure is provided from the knowledge base of the structure, said parametric model comprising coordinates of control points of the structure, parameterized as a function of estimators of anatomical data of the structure.

17. A method for reconstruction according to claim 1 wherein, at step (b), a knowledge base of the structure is provided, which comprises coordinates of control points of each object for structures of the same type as the structure to be reconstructed, said structures of the same type each comprising objects of the same type as the objects of the structure to be reconstructed, said knowledge base being adapted to calculate coordinates of control points for the subject-specific reconstruction of the second portion of object from said coordinates of control points of portions of objects of the same type as the second portion of object and from estimators of anatomical data parameters of the structure to be reconstructed.

18. A method for reconstruction according to claim 1, wherein said preliminary solution of structure is calculated by:
- (c1) fitting a subject-specific reconstruction of at least one of said objects to a corresponding item on said detection data,
- (c2) automatically calculating the preliminary solution of each of said objects except said at least one object from the subject-specific reconstruction of said at least one object and from said detection data.

19. A method for reconstruction according to claim 1, wherein, at step (a), bi-dimensional X-ray detection data is provided.

20. A method for reconstruction according to claim 1, wherein, at step (a), said subject-specific data is provided comprising at least two bi-dimensional images of the body structure taken from different orientations, and wherein, at step (e), the preliminary solution of the first portion of object is fitted to both images.

21. A method for reconstruction according to claim 1 wherein, prior to step (a), subject-specific data of the structure is acquired.

22. A method for reconstruction according to claim 1, wherein at step (a), detection data of said structure is provided comprising two calibrated bi-dimensional radiographs of the body structure taken from different orientations.

23. A method according to claim 1, wherein steps (c)-(f) are performed iteratively, the preliminary solution used at step (c) of the subsequent iteration being obtained from the subject-specific reconstruction obtained at step (f) of a previous iteration.

24. A method according to claim 23 wherein the first portion of object in a subsequent iteration is a different portion of object from the first portion of object in a previous iteration.

25. A method according to claim 1, wherein, at step (d), the preliminary solution of a whole first object is selected, wherein, at step (e), the preliminary solution of the whole first object is modified, and wherein, at step (f) the three-dimensional subject-specific reconstruction of a whole second object is obtained.

26. A method according to claim 1 wherein, at step (f) the three-dimensional subject-specific reconstruction of another portion of the first object is obtained.

27. A method according to claim 1, wherein the body structure is an osteo-articular structure, and wherein the objects are bony objects.

28. A non-transitory computer-readable medium having embodied thereon computer-readable program code causing a programmable unit to perform the method of claim 1 when executed on said programmable unit.

29. A non-transitory computer-readable medium having embodied thereon a knowledge base of a body structure, said body structure comprising a plurality of objects, said knowledge base being for use in a method for reconstruction of a three-dimensional model of a subject-specific body structure based on subject-specific data, said knowledge base comprising a priori knowledge of the body structure, previously established from structures of the same type as the subject-specific structure, said knowledge base of structure comprising a knowledge base of each object of the structure, said knowledge base of structure being adapted to estimate, from a parameter of any object of the structure, another parameter for at least one object of the structure, the knowledge base of each object being adapted to estimate, from a parameter of the respective object, a three-dimensional subject-specific reconstruction of at least a portion of the respective object.

* * * * *